United States Patent [19]

Lin

[11] Patent Number: 5,649,778
[45] Date of Patent: Jul. 22, 1997

[54] MULTI-DIRECTIONAL HYDRAULIC SWIVEL JOINT

[76] Inventor: Wei-Hwang Lin, Suite 2, 7F, No. 95-8 Chang Ping Road, Sec. 1, Taichung, Taiwan

[21] Appl. No.: 654,141

[22] Filed: May 28, 1996

[51] Int. Cl.$^6$ ............................................. F16D 3/16
[52] U.S. Cl. ........................... 403/31; 403/57; 403/74; 464/27; 464/136
[58] Field of Search .................... 403/57, 74, 31, 403/15; 464/27, 136, 24, 106, 112

[56] References Cited

U.S. PATENT DOCUMENTS

| | | | |
|---|---|---|---|
| 4,099,762 | 7/1978 | Hultdin et al. | 403/31 X |
| 4,188,142 | 2/1980 | Olsson | 403/31 |
| 4,318,572 | 3/1982 | Noha et al. | 308/2 R |
| 4,557,623 | 12/1985 | Tella | 403/31 |
| 5,544,968 | 8/1996 | Goellner | 403/31 |

FOREIGN PATENT DOCUMENTS

| | | | |
|---|---|---|---|
| 2805619 | 8/1978 | Germany | 464/27 |
| 590508 | 1/1978 | U.S.S.R. | 403/57 |

Primary Examiner—Harry C. Kim

[57] ABSTRACT

A multi-dirctional swivel joint for carrying loading members comprises a crosswise main body having a pair of first and a pair of second hollow cylinder members perpendicular to one another each having connected with a stepped neck member at their free end and pivotally and intersectionally coupled with a pair of lug members so as to permit the main body swiveling alternatively therewithin in multi-directions. A piston member slidingly disposed into each of the hollow cylinder members for defining a pair of first and second cylinder chambers which respectively communicate with an ambient hydraulic compressor via a pair of the first and second conduits through the piston member therein, in addition to a retaining ring sleeved on the free end of the piston member and secured by nut. So that the coupling of the main body with the lug members can be tightened or released upon the alternative exertion of the hydraulic force from the ambient compressor.

6 Claims, 4 Drawing Sheets

MULTI-DIRECTIONAL HYDRAULIC SWIVEL JOINT

BACKGROUND OF THE INVENTION

The present invention relates to the swivel joints, and more particularly to a multi-directional hydraulic swivel joint which has an improved structure for permitting the swiveling of the joint thereof across a substantial range of angles in multiple directions and which has been characterized in automatic positioning.

Prior art swivel joint most likely has a structure permitting swiveling the joint only in single direction. This can not satisfy a full testing of a specimen both in the tension and compression testing or broadly apply to a mechanical arm of an industrial robot. U.S. Pat. No. 4,318,572 discloses a Tension-compression swivel joint with hydraulic force reaction which permits a quite wide ranges of swiveling without friction problems, but which has the same disadvantage of directional limitation. The joint as disclosed only permits to swivel along a front and rear direction but can not swivel laterally. This limits the joint to perform dual directional swiveling function. According to the theory and actual experiments, it is understood that a single directional swivel joint is not sufficient to apply to a mechanical arm of an ordinary industrial robot and the grips of an universal testing machine or a tool mechine for their precise adjustment and positioning purpose. Up to now, insofar as it is aware, the art contains no indication of the desirability of providing a multi-directional swivel joint as disclosed in this invention which tends to solve the above recited problems in the domain of the specimen test.

SUMMARY OF THE PRESENT INVENTION

The present invention has a main object to provide a multi-directional hydraulic swivel joint which permits the swiveling of the joint across a substantial range of angles in dual directions in order to increase the accuracy of specimen testing.

Another object of the present, invention is to provide a multi-directional hydraulic swivel joint which is characterized in automatic positioning.

Accordingly, the multi-directional hydraulic swivel joint of the present invention comprises a crosswise main body which has four hollow cylinder members extended outwardly from the body and disposed perpendicular to each other, a stepped neck member screw secured to each of the hollow cylinder members, a piston member having a large diameter inward end slid into the central bore of the cylinder member and retained by the stepped neck member and a retaining ring sleeved onto the outward end of the piston member and secured by a nut. A pair of U-shaped lug members intersectionally and pivotally coupled with the main body each has a pair of axial boles on their ears diametrically equal to that of the outer periphery of the neck member so as to be pivoted with the neck member. A first and a second hydraulic chambers are defined by the inner periphery of the hollow cylinder member and the inward end of the piston member and communicated to an outside hydraulic power source via a pair of conduits inside the piston member, so that the piston member is operated by hydraulic force to slide about the cylinder member therein for adjusting the gripping space between the free end of the neck member and the inward surface of the retaining ring, in order to obtain more precise specimen testing and dual directional swiveling purpose.

The present invention will become more fully understood by reference to the following detailed description thereof when read in conjunction with the attached drawings.

DETAILED DESCRIPTION OF THE PREFERRED EMBODIMENT

Figure 1:
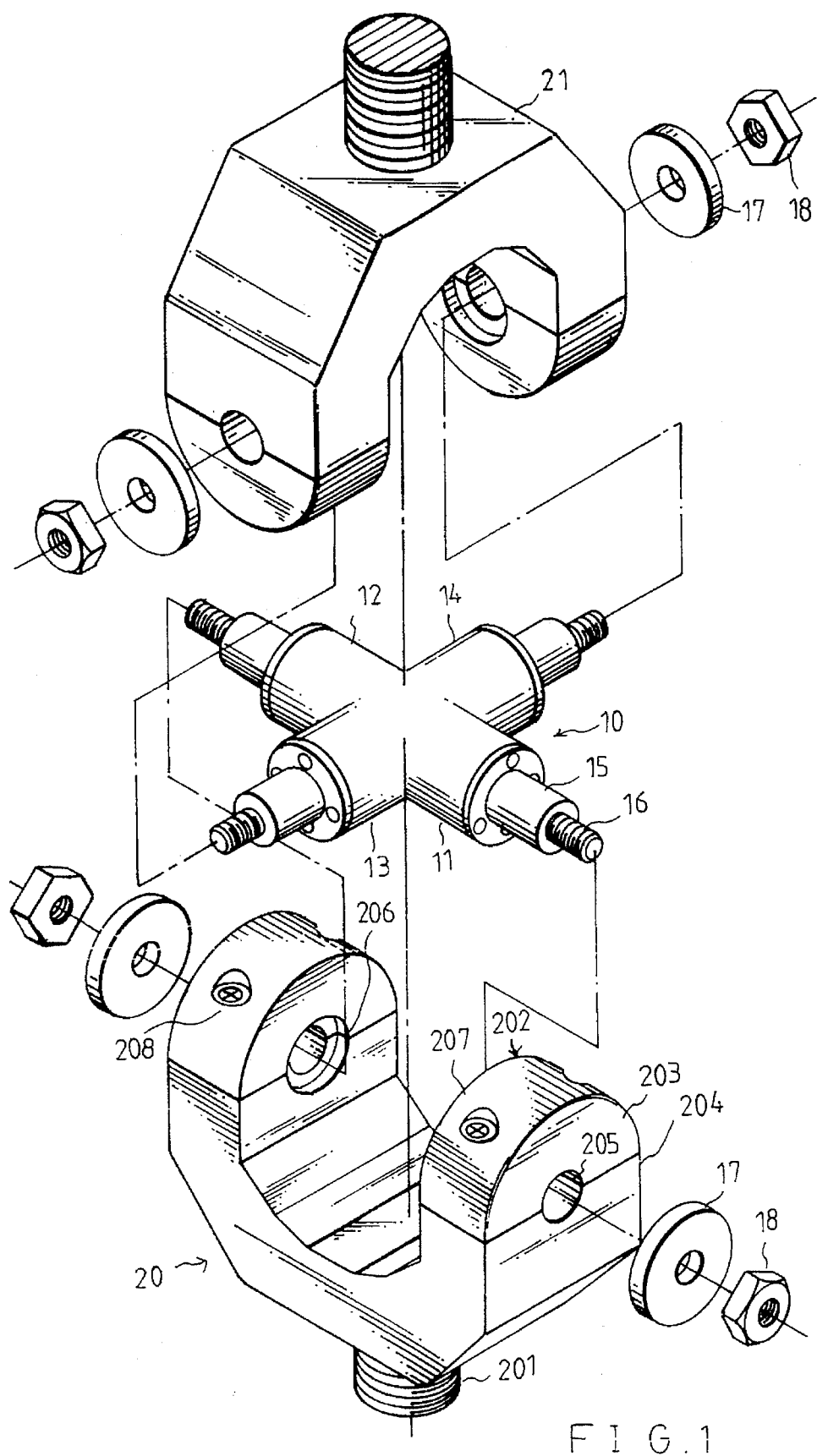
FIG. 1 is an exploded perspective view to show the preferred embodiment of the present invention.
Figure 2:
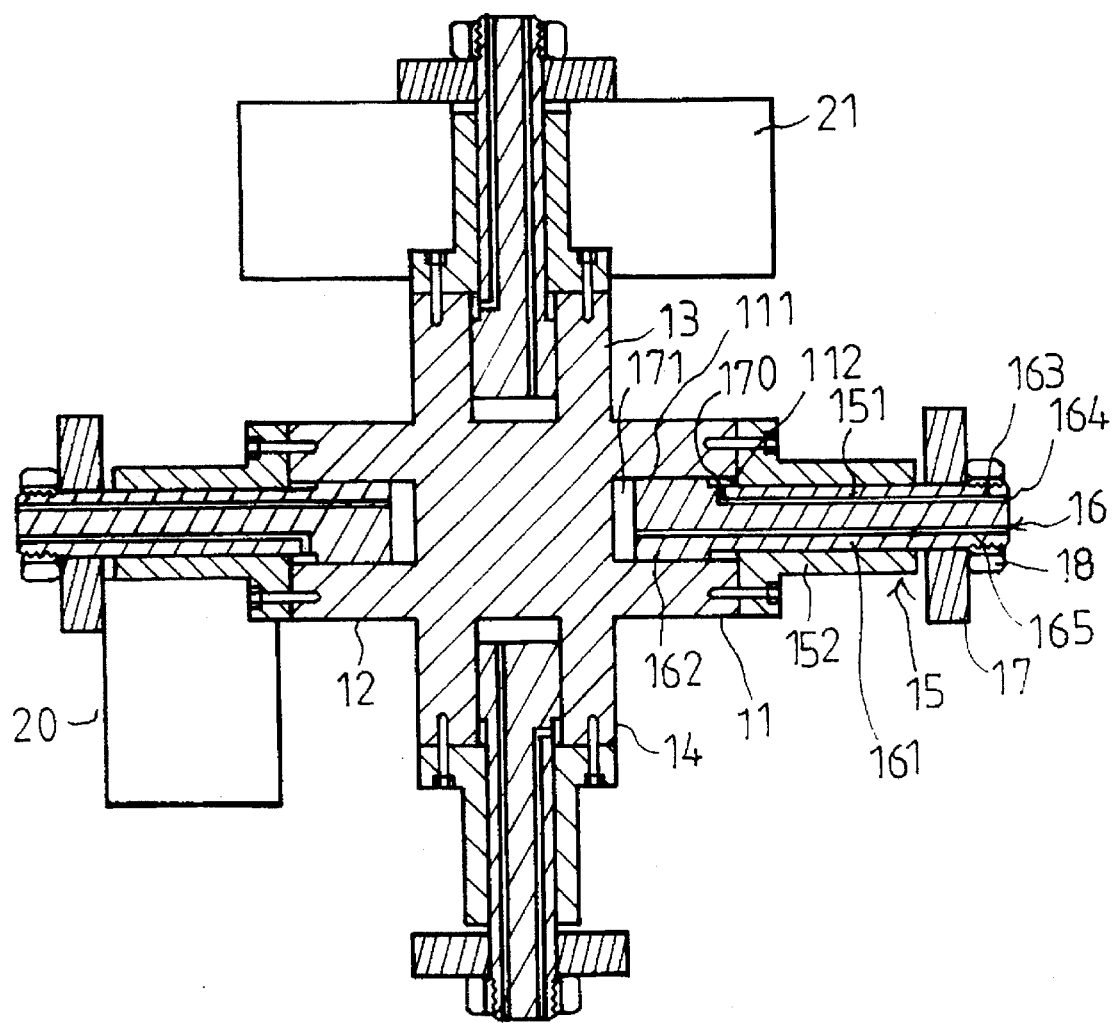
FIG. 2 is a sectional view to show an assembled swivel joint of the present invention.

Referring first to FIGS. 1 and 2 of the drawings, the multi-directional hydraulic swivel joint of the present invention comprises a crosswise main body 10 which is composed of a pair of the first hollow cylinder members 11 and 12 and a pair of second hollow cylinder members 13 and 14 disposed perpendicular to each other and extended outward from the main body 10 toward their opposite directions. The first and second hollow cylinder members 11, 12, 13 and 14 are the same in size, each has a central bore 111 having an opening toward outward and a stepped neck member 15 screw connected to the free end thereof. The neck member 15 has a central bore 151 diametrically less than bore 111 and a less diameter outward portion 152. A shoulder 112 is defined between bore 111 and bore 151. A piston member 16 has a cylinder body 161 coped with bore 151, a large diameter inward end 162 coped with bore 111 and a threaded outward end 163. The piston member 16 slides into bores 111 and 151 and retained by shoulder 112 therein. A retaining ring 17 having a circular body and a central hole diametrically coped with that of said piston member sleeves onto the outward end of the piston member 16 and is secured by a nut 18. A pair of first and second lug members 20 and 21 each comprises a threaded rod 201 integrated with a bottom center thereof and a pair of ears 202 parallel projected upward from lateral sides. The ears 202 each is divided into an upper portion 203 and a lower portion 204 and a stepped axial hole 205 is defined therebetween. The axial hole 205 has a large diameter portion 206 toward inward coped Kith the cylinder members 11, 12, 13 and 14 and the rest portion diametrically coped with outward portion 152 of the neck member 15 so as to permit the fore end of the cylinder members and the neck member 15 to be pivoted therein. Both the upper portion 203 and the lower portion 204 of the ear 202 have a pair of vertical screw holes 207 aligned with each other so that the two portions 203 and 204 are connected by screws 208.

When assembling, couples at first a pair of the cylinder members into axial holes 205 of the lug member in the manner such that couples the first pair of the cylinder members 11 and 12 into the axial hole 205 of a first lug member 20 and connects the upper portion 203 with the lower portion 204 of the ears 202 in order to pivotally retain the first pair of cylinder members 11 and 12 therein, and then couples the second pair of cylinder members 13 and 14 into the axial holes 205 of a second lug member 21 and retains pivotally by the upper portions 203 of the ears 202 as recited above. Finally, sleeves a retaining ring 17 onto the free end of each piston member 16 from outside of the axial holes 205 and secures by bolts 18. Upon such arrangement, the crosswise main body 10 can intersectionally swivel in four directions within the pair of the lug members 20 and 21 as shown in FIG. 2. The assembly is then connected with other clips and the ambient hydraulic compressor.

Figure 3:
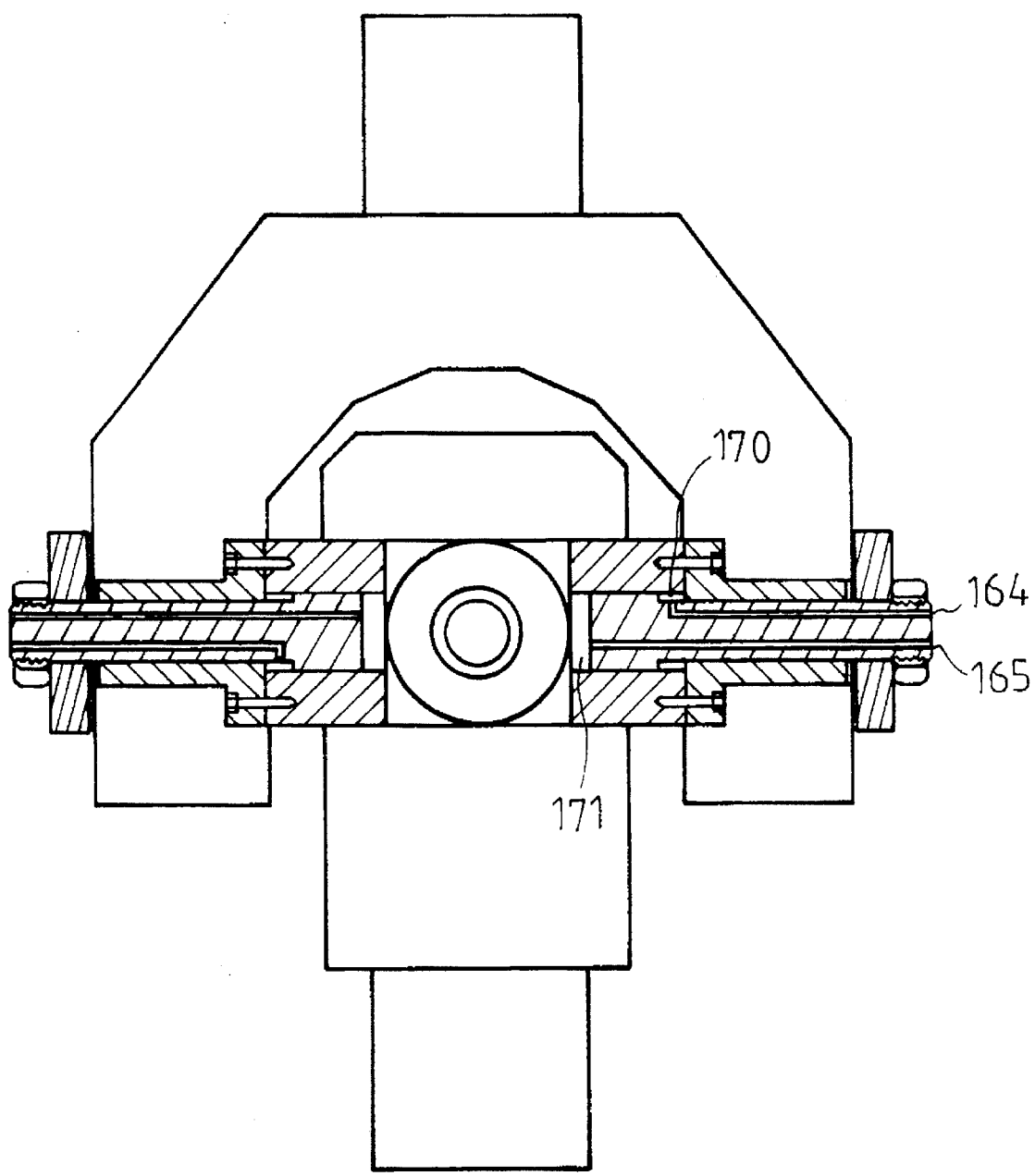
FIG. 3 is a sectional view to show a hydraulic system within the hollow cylinder members of the present invention.

Referring to FIG. 3, a hydraulic system defined between each of the cylinder members and it's piston member is shown. Each piston member 16 further has a pair of first and second concuits 164 and 165 for respectively introducing the hydraulic fluid from an ambient hydraulic compressor into a first and a second cylinder chambers 170 and 171. The first cylinder chamber 170 is defined between the shoulder 112 and the flange of the inward end 162 of the piston member 16 and the second cylinder chamber 171 is defined between the bottom of bore 111 and the inward end 162 of the piston member 16. By this arrangement, when supplies sufficient hydraulic fluid into the first cylinder chamber 170 via the first conduit 164, and releases simultaneously the hydraulic fluid from the second cylinder chamber 170 via the second conduit 165, the hydraulic pressure acts between the shoulder 112 and the flange of the inward end 162 to force the piston member 16 moving inwardly to narrow the gripping space between the retaining ring 17 and the outward surface of the ears 202 so as to permit a tightening movement of the hollow cylinder member with the lug member in certain degree. If operates inversely to supply sufficient hydraulic fluid into the second cylinder chamber 171 and to release the hydraulic fluid from the first cylinder chamber 170 simultaneously, the hydraulic pressure acts between the bottom of bore 111 and the inward end 162 of the piston member 16 that forces the piston member 16 moving outward to widen the gripping space between the retaining ring 17 and outward surface of the ears 202 so as to permit a smooth pivoting of the hollow cylinder member with the lug member. A skillfull adjustment of the piston member 16 by applying alternative hydraulic pressures will exhibit several gripping modes such that one of the two lug members 20 and 21 may be fixed with respective hollow cylinder members 11 and 12 to having the crosswise main body 10 to he horizontal or tilted in certain angle and the other lug member 21 remains pivotal with respective hollow cylinder members 13 and 14 so as to permit the main body 10 to swivel only in single direction. If the two lug members 20 and 21 are pivotal with their respective cylinder members, the main body 10 may swivel in multi-directions.

Figure 4:
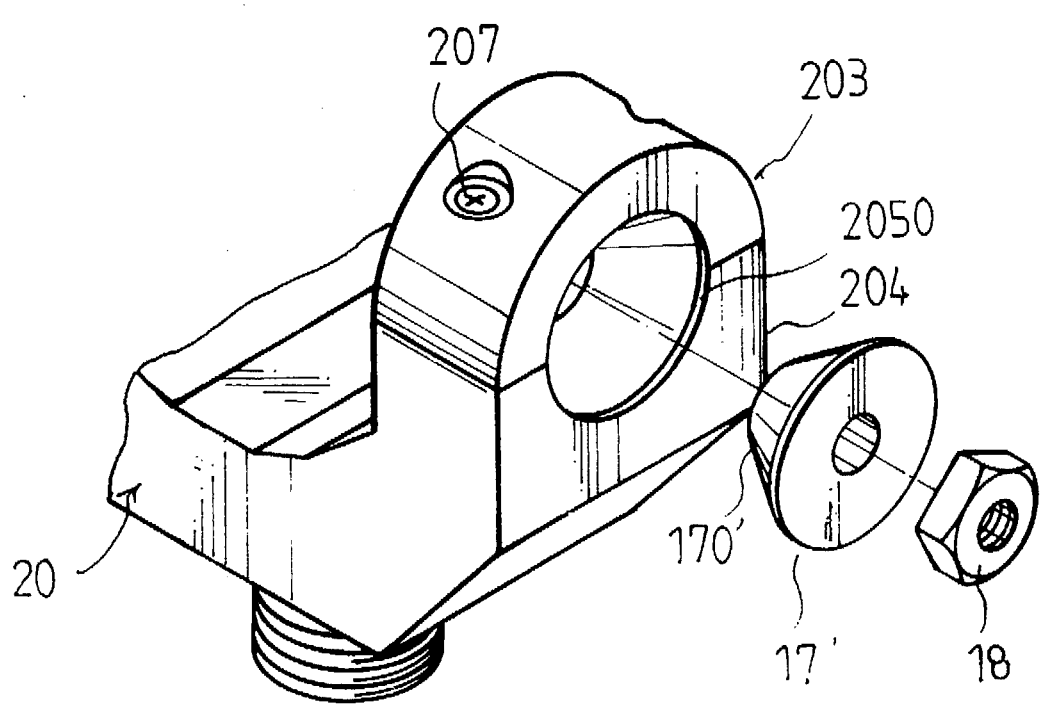
FIG. 4 is a perspective view to show an alternative embodiment of a retaining ring and an axial hole on the ears of the lug members.

Referring to FIG. 4, an alternative retaining ring 171 is shown, in which a taper projection 170' is formed at the inward side thereof. In cooperation with the taper projection 170', a less diameter taper slot 2050 is formed abutting the outward end of the axial hole 205. Upon this structure modification, it provides an urgent tightening rather than an enforceable tightening.

While the above description contains many features, these should not be interpreted as limitation on the scope of the present invention, but merely as one mode of actualization of the preferred embodiments thereof. Accordingly, the scope of the invention should not be determined by the above exposition but by the appended claims and their legal equivalents.

I claim:

1. A multi-directional swivel joint actuated by hydraulic force comprising:

a crosswise main body having a pair of first hollow cylinder members and a pair of second hollow cylinder members disposed perpendicular to said pair of first hollow cylinder members, said pairs of first and second hollow cylinder members extending outward from said main body toward opposite directions, wherein each of said hollow cylinder members comprising a central bore having an opened end and a closed end;

a stepped neck member connected by screws to said each hollow cylinder member, said stepped neck member having a first portion with an outer diameter, a second portion with an outer diameter which is less than the outer diameter of said first portion, and a central bore, wherein an inner diameter of said central bore of said stepped neck member is less than an inner diameter of said central bore of said hollow cylinder member so as to define a shoulder therebetween;

a piston member slidingly disposed in said central bores of said hollow cylinder member and said stepped neck member, said piston member comprising a first end portion having an outer diameter larger than said inner diameter of said central bore of said stepped neck member so as to be retained within said central bore of said hollow cylinder member by said shoulder and a second end portion having peripheral threads extending beyond said second portion of said stepped neck member;

a retaining ring having a circular body and a central hole diametrically coped with that of said piston member, said retaining ring being sleeved onto said second end portion of said piston member and secured by a nut so as to define a gripping section between said first portion of said stepped neck member and said retaingin ring; and a pair of lug members pivotally and intersectionally coupled with said crosswise main body on the respective gripping sections thereof, whereby said crosswise main body swivels alternately within said pair of lug members in multi-directions.

2. The multi-directional swivel joint according to claim 1, wherein each of said pair of lug members having a thread rod centrally integrated with a bottom thereof and a pair of ears projecting upward from lateral sides thereof.

3. The multi-directional swivel joint according to claim 2, wherein each of said ears comprising an upper portion and a lower portion, said upper and lower portions having a pair of aligned vertical screw holes for connecting to each other by screws and defining a stepped axial hole therebetween, said axial hole having a larger diameter portion.

4. The multi-directional swivel joint according to claim 3, wherein said lug member further includes a taper slot formed abutting the large diameter portion of said stepped axial hole.

5. The multi-directional swivel joint according to claim 4, wherein said retaining ring has a taper portion for mating with said taper slot of said lug member.

6. The multi-directional swivel joint according to claim 1, wherein said joint further comprises first and second cylinder chambers, said first cylinder chamber being defined between said shoulder and said first end portion of said piston member and said second cylinder chamber being defined between said closed end of said central bore of said hollow cylinder member and said first end portion of said piston member, said piston member having first and second conduits disposed parallel through said piston member to connect respectively to said first and second cylinder chambers.

* * * * *